United States Patent
Shelton et al.

[15] 3,635,723

[45] Jan. 18, 1972

[54] ANIMAL RATION

[72] Inventors: Damon C. Shelton, St. Louis; Curtis E. Blankenship, Manchester, both of Mo.

[73] Assignee: Ralston Purina Company, St. Louis, Mo.

[22] Filed: Aug. 30, 1968

[21] Appl. No.: 756,405

[52] U.S. Cl. .................................................99/2 R, 99/131
[51] Int. Cl. .........................................................A23k 1/00
[58] Field of Search..............99/166, 171 H, 171 LP, 2, 171, 99/1, 129, 130, 131, DIG. 3

[56] References Cited

UNITED STATES PATENTS

| | | | |
|---|---|---|---|
| 2,380,134 | 7/1945 | Waters | 99/214 |
| 2,593,577 | 4/1952 | Lewis | 99/2 |
| 2,951,765 | 9/1960 | Robson | 99/171 |
| 3,132,029 | 5/1964 | Beck | 99/171 |
| 3,215,539 | 11/1965 | Landy | 99/1 |

*Primary Examiner*—Norman Yudkoff
*Assistant Examiner*—Curtis P. Ribando
*Attorney*—Robert W. Brukardt

[57] ABSTRACT

A method of caring for axenic animals is disclosed. The animals are fed a ration containing their entire requirements of water and nutritional materials packaged in a container which can be opened by the animal and which is sterilized before being introduced to the animals. The ration is in the form of a stable gel containing 70–80 percent water.

6 Claims, No Drawings

ANIMAL RATION

Modern research is demanding an increasing number of laboratory animals which are free of disease, parasites, and extraneous contamination. To provide animals meeting these criteria, it is necessary to rear the animals in a completely isolated environment and to take great precautions to avoid contaminating the animals. The technique of caring for germ-free or axenic animals is quite complicated, expensive and time consuming. It is common for breeders to derive the colonies by a Caesarean section to avoid contamination occurring in normal birth. After birth, the animals are maintained in an isolated, sterile container or isolator throughout their growth span. Special containers are used to ship the animals to the users so that the animals arrive in a sterile condition.

Feeding, watering and caring for the animals requires constant precautions to avoid contamination. All feed, water and bedding used must be sterile and must be used in a way that prevents contamination of the animal colony. This has been a considerable problem for the industry. To prevent contamination it is commonplace to sterilize all feed, water and bedding by autoclaving. The feed, water and bedding are usually subjected to steam at a pressure of about 15 pounds per square inch and a temperature of about 250° F., to kill the microbes present. The sterilized material is then transferred to the sterile isolator through a transfer sleeve (an air lock device which usually is sterilized with peracetic acid). Elaborate precautions must be taken to insure that no contamination is introduced to the isolator through the transfer sleeve. This procedure is time consuming and costly. Following the accepted procedure does not insure that the material introduced to the container will be sterile, however. The process of sterilization must be carried out long enough to kill all the micro-organisms in the feed, water and bedding. This introduces an additional complicating factor. If the feed is heated too long, a substantial portion of the nutritional value is destroyed. If the feed is not heated long enough, the feed in the center of the mass is not heated to a temperature sufficient to kill the microbes. Adding heat-stable supplements to the feed is expensive and is only partially successful in extending the time of heating to a point to insure sterilization of the feed.

Another drawback of present methods of providing feed to isolators is the necessity of storing quantities of feed in the isolator to avoid daily manipulation of the transfer sleeve. The stored feed occupies space which could be used more profitably to raise animals. A detailed discussion of the problems of raising axenic animals can be found in "Apparatus and Method for the Steam Sterilization of Food for Germ-Free Laboratory Animals," by Richard B. Westcott and John A. Gardner. (Technical Manuscript 7, U. S. Army Chemical Corps Research and Development Command, U. S. Army Biological Laboratories, Fort Detrick, Maryland, 1962) and in "The Development of Specific Pathogen Free and Germfree Animals," by Henry L. Foster (Bio-Medical Purview, Fall 1961).

The invention described here provides a method of caring for laboratory animals which reduces the possibility of contamination of the animals through the feed and water supply and through manipulation of the means of introducing feed and water to the animals. Feed and water are introduced to the animals in a novel sealed and sterile form which the animals can open and consume ad libitum. Feed and water are packaged in a way to form a novel gelled feed and water composition which provides a complete ration and which is stable when introduced to laboratory animals.

It would eliminate much of the difficulty in providing for axenic, gnotobiote, or specific pathogen free animals if the feed and water could be introduced together as a stable gel. By introducing the water as a gel all of the considerable difficulties of handling water and water bottles are avoided. If the feed and water were contained in flexible, penetrable packages which would maintain their contents in a stable, sterile form for a relatively long period of time, the material could be manufactured in large quantities, stored, and subjected to a simple, surface sterilization prior to introducing it to the animals. The animals could penetrate the flexible package by chewing through the material and obtain food and water ad libitum.

The composition of the gel should be such that the nutritional requirements of the animals are satisfied and enough water is provided to meet the optimum water requirements of the animals. Generally, a gel containing 70 to 80 percent water, 5 to 15 percent protein, 10 to 25 percent carbohydrates, 0.5 to 2.5 percent fat, and 0.5 to 1.5 percent fiber, is satisfactory. The following table provides the composition which will provide a stable, gelled product having the desired nutritional characteristics.

TABLE I

| Ingredients of gel | Percent by weight | Nutrient composition of gel, percent by weight | | | |
|---|---|---|---|---|---|
| | | Protein | Carbohydrate | Fat | Fibre |
| Soybean meal or flakes | 1-9 | .5-4.5 | .3-2.9 | 0-.3 | 0-.3 |
| Ground corn or milo | 1-18 | .1-1.6 | .7-12.5 | 0-.6 | 0-.5 |
| Fishmeal or fish flour | .2-3 | .1-1.8 | | 0-.3 | |
| Wheat middlings or flour | .4-6 | .1-.9 | 2-4.5 | 0-.2 | 0-.5 |
| Meat meal or liver meal | .2-3 | .1-1.5 | | 0-.3 | 0-.1 |
| Alfalfa meal or #1 alfalfa | 0-2 | 0-.3 | 0-.5 | | 0-.6 |
| Ground oats or oat groats | 0-3 | 0-.5 | 0-1.9 | 0-.2 | 0-.4 |
| Ground wheat or wheat flour | 0-6 | 0-1.0 | 0-4.2 | 0-.2 | 0-.3 |
| Molasses or syrup | 0-2 | | 0-.9 | | |
| Corn oil, vegetable or animal fat | 0-1.5 | | | 0-1.5 | |
| Water | 70-80 | | | | |

We have found, however, that is maximum reproduction of the animal is desired, as where laboratory animals are produced for sale to the scientific market, it is necessary to have a composition having 74 to 77 percent water, 6 to 8 percent protein, 12 to 18 percent carbohydrates, 0.7 to 1.5 percent fat, and 0.9 to 1.3 percent fiber. Table II discloses a composition which will provide a stable, gelled product having the desired composition for a ration providing the nutrients necessary for maximum reproduction.

TABLE II

| Ingredients of gel | Percent by weight | Nutrient composition of gel, percent by weight | | | |
|---|---|---|---|---|---|
| | | Protein | Carbohydrate | Fat | Fibre |
| Soybean meal or flakes | 4.3-5.7 | 2.1-2.9 | 1.4-1.8 | 0-.2 | .1-.2 |
| Ground corn or milo | 10-14 | .9-1.3 | 6.9-10 | .3-.5 | .3-.4 |
| Fishmeal or fish flour | 1.6-2.3 | 1-1.4 | | .1-.2 | |
| Wheat middlings or flour | 1-1.8 | .2-.3 | .6-1.4 | 0-.1 | .1-.2 |
| Meat meal or liver meal | .7-1.3 | .4-.7 | | 0-.1 | |
| Alfalfa meal or #1 alfalfa | .2-.8 | 0-.1 | .1-.3 | | .1-.2 |
| Ground oats or oat groats | .5-1 | .1-.2 | .3-.7 | 0-.1 | 0-.1 |
| Ground wheat or wheat flour | .5-1.6 | .1-.3 | .3-1.2 | | 0-.1 |
| Molasses or syrup | .5-1 | | .3-.6 | | |
| Corn oil, vegetable or animal fat | .2-.8 | | | .2-.8 | |
| Water | 74-77 | | | | |

In addition to the nutrients given in tables I and II it may be desireable to provide additional supplementation of vitamins and minerals that the particular laboratory animals may require. Phosphorus, sodium chloride, and additional vitamins are common supplements which may be added to the composition. Normally, the total supplementation will not exceed about 2 percent by weight of the stable water-nutrient gel. Preferred formulas for providing a completely balanced ration are shown by table III.

TABLE III

| Number | 1 | 2 | 3 | 4 | 5 | 6 | 7 | 8 | 9 | 10 |
|---|---|---|---|---|---|---|---|---|---|---|
| Soybean flakes, percent | 30.00 | 18.36 | 16.32 | 18.13 | 19.69 | 35.20 | 18.75 | | | 20.00 |
| Ground yellow corn | 41.72 | 43.80 | 38.93 | 45.42 | 45.06 | 5.00 | 51.85 | 39.72 | | 47.70 |
| Fish meal | 7.00 | 7.34 | 6.53 | 7.83 | 7.87 | 15.03 | 1.00 | 7.00 | 5.43 | 8.00 |
| Wheat midds | 5.43 | 5.69 | 5.06 | 6.07 | 6.10 | 10.91 | 6.74 | 5.43 | 3.43 | 6.20 |
| Meat meal | 3.50 | 3.67 | 3.26 | 3.91 | 3.93 | 7.04 | 4.35 | 3.50 | 3.50 | 4.00 |
| Dehydrated alfalfa meal | 1.75 | 1.83 | 1.63 | 1.95 | 1.96 | 3.52 | 2.17 | 1.75 | 1.75 | 2.00 |
| Ground oats | 1.75 | 10.00 | 1.63 | 1.95 | 1.96 | 3.52 | 2.17 | 1.75 | 1.75 | 2.00 |
| Ground wheat | 1.75 | 1.83 | 20.00 | 1.95 | 1.96 | 3.52 | 2.17 | 1.75 | 1.75 | 2.00 |
| Molasses | 2.63 | 2.75 | 2.44 | 5.00 | 2.95 | 5.28 | 3.26 | 2.63 | 2.63 | 3.00 |
| Defluorinated phosphate | .88 | .99 | .81 | 2.93 | .98 | 1.76 | 1.09 | .88 | .88 | 1.00 |
| Methionine | .09 | .09 | .08 | .97 | .09 | .18 | .11 | .09 | .09 | .10 |
| Vitamins [1] | 1.75 | 1.83 | 1.63 | 1.95 | 1.96 | 3.52 | 2.17 | 1.75 | 1.75 | 2.00 |
| Salt NaCl | .44 | .45 | .46 | .48 | .49 | .88 | .54 | .44 | .44 | .50 |
| Corn oil | 1.31 | 1.37 | 1.22 | 1.46 | 5.00 | 2.64 | 1.63 | 1.31 | 1.31 | 1.50 |
| Sodium alginate | | | | | | 2.00 | 2.00 | 2.00 | 2.00 | |
| Soybean meal | | | | | | | | 30.00 | 13.29 | |
| Ground milo | | | | | | | | | 60.00 | |

[1] The vitamin supplement was a combination of vitamins commercially available from Ralston Purina Company, St. Louis, Mo. under the name, Micropremix 5010C. It contained vitamins A, D, E, and K, thiamin, riboflavin, niacin, pyridoxine, folic acid, biotin, and pantothenic acid.

The proportions in table III are given on a dry basis. The dry mixture of table III is mixed with sufficient water to give it a total moisture content of 70 to 80 percent. A mixing ratio of 2.8 parts water to 1 part dry mixture, by weight, provides 74 percent added moisture or a total moisture content of about 76 percent by weight. If desired, it is possible to add mold inhibitors to the product. Table IV shows several mold inhibitors which have been found effective in the stabled gel composition. The portion of mold inhibitor added is calculated on the basis of the dry material in the stabled gel.

TABLE IV

| Mold Inhibitor | % by Weight of Dry Ingredients |
|---|---|
| Sorbic Acid | 0.1 |
| Phosphoric Acid | 0.1 |
| Propylene Glycol (Replaces Water) | 5.0 |
| Cane Sugar (Replaces Molasses and Corn) | 5.0 |

The mixed water and nutrient material is packaged in a flat, rectangular pouch formed of a suitable film material. The mixture is vacuum heat sealed in the pouch and heated to form a sterile, stable gel. The pouch is preferably formed of a three-ply lamina. A lamina of aluminum foil bonded to a ply of polyester on one side and fused with a ply of polyethylene on the second side has proven to be Ohio, satisfactory. Other film materials may be used for some applications. A discussion of suitable films and their properties can be found in "Flexible Packages Now Withstand Heat-Processing Temperatures of Foods," by Florren E. Long (Package Engineering, Mar. 1962). Additional information can be found in "Bacterial Resistance of Films," by R. G. Griffin et al. (Modern Packaging, Oct. 1967) and in "Heat Processing of Vegetables in Flexible Films," by W. A. Gould et al. (Research Bulletin 905, Ohio Agricultural Experiment Station, Wooster, Ohio, Apr. 1962). The pouch can be formed in several sizes; 4-ounce, 8-ounce, and 1-pound packages are the most convenient sizes for feeding laboratory animals. The formulation shown in table III, column 10, was used to produce a batch of 1-pound packages of a gelled material. The material was processed by the following method:

EXAMPLE 1

The dried components were mixed in a mixer and introduced to a Jacobsen Hammer Mill equipped with a 1-millimeter screen. The mixture was ground to a fineness sufficient to pass through the 1-millimeter screen. The ground mixture was then remixed to insure that no segregation of ingredients existed. The mixed dry ingredients where then introduced into a large container and 74 percent by weight added moisture was introduced. The temperature of the added moisture was maintained between about 140° and 190° F. (The elevated temperature helps in killing off any organisms that are present in the feed; 150°–160° F. is a satisfactory range.) The water and dry material were mixed with an agitator for approximately 5 minutes to obtain a uniform slurry. The slurry was pumped from the mixing vessel to a filling machine where it was introduced into the pouches. The pouches were filled so that approximately 1 lb. of product was placed in each pouch. After filling, the pouches were vacuum heat sealed. The heat sealed pouches were placed in a rack having slots three-fourths inch wide. The narrow width of the slots was necessary to insure that the pouches did not bulge to a thickness sufficient to cause cool spots in the center of the pouch (places where the material is not heated sufficiently to kill any organisms present). After the pouches were placed in the retort racks the pouches and racks were placed in a retort and heated to a temperature of 250° F. During processing an additional 9–10 pounds of superimposed air pressure was maintained on the retort to prevent rupturing the packages by generation of internal steam. [See "Flexible Packages Now Withstand Heat-Processing Temperatures of Foods," by Florren E. Long (Package Engineering, Mar. 1962).] The time of treatment was approximately 25 minutes to reach 250° F., 20 minutes at 250° F., and 20 minutes cooling time. The pouches were at ambient temperature when removed from the retort. When removed from the retorting process the material in the pouches was in the form of a stable gel.

The ground material disperses well in the hot water and can be processed directly if agitated until the packages are filled. However, if the slurried material is held at rest for a sufficient length of time (over 1 to 2 hours) without agitation, the solid material will settle out. If it is necessary to hold the material for some time without agitation, a dispersing agent can be added to the material. It is important to avoid adding too much dispersing agent, however, in order to preserve the proper proportion of water and nutrients in a stable gel. We have found that a highly refined sodium alginate of 150 mesh particle size is effective in maintaining the nutrients in a dispersed state when added in the amounts of 0.4 to 1 percent by weight of the stable gel. 0.5 percent of sodium alginate maintained a sample of the material used in example 1 in suspension for more than 6 hours. A satisfactory sodium alginate may be obtained from the Kelco Company, Chicago, Ill. under the trade name of Keltone.

The method of example 1 has also been used successfully to package several experimental batches of 4-oz. and 8-oz. packages, which have been used in feeding studies with laboratory animals. In one test an experimental shipment of Wistar rats was sent from Staatsburg, N.Y. to St. Louis, Mo. The shipment consisted of six cartons of animals. Each carton contained 10 rats. Two 4-oz. pouches of the stable feed and water gel were placed in each carton as the only source of food and water for the animals. The exterior surfaces of the pouches were sterilized with Wescodyne solution, a soluble iodine solution, prior to being introduced to the animals. The cartons were sealed and the animals were placed in transit. The animals were housed in the cartons for approximately 10 hours. When the animals were removed from the cartons, they were examined and found to be in excellent health. The pouches in each carton had been penetrated by the animals. The feed and water remained in a stable gel form and did not flow out of the open pouches. The animals consumed their requirement of food and water through the penetrated area of the pouch. At the end of the experiment, the animals exhibited no desire for additional water, indicating no substantial dehydration of the animals during transit. The stable feed and water gel was equivalent to water provided to the animals ad libitum.

A series of breeding experiments has been conducted using the stable feed and water gel to determine its value as a complete ration, and to duplicate its use as a sustaining ration for axenic animals. To date, four generations of animals have received the stable feed and water gel exclusively since weaning. Table V summarizes the results of the first generation growing study. The stable gel provided the entire water and nutritional requirement for the animals in the test group with good growth and no mortalities, though there was a mortality in the control group. Reproduction of the animals fed the gel has been excellent, averaging about 12 live pups per litter in the test group.

TABLE V

|  | Water ad libitum and laboratory ration | Feed water gel | Adjusted to air, dry basis |
|---|---|---|---|
| Count started | 10 | 10 | |
| Count finished | 9 | 10 | |
| Number mortalities | 1 | 0 | |
| Percent mortality | 10.00 | | |
| Average weights (gram): | | | |
| Initial | 52.0 | 52.6 | |
| 7 days | 87.7 | 87.4 | |
| 14 days | 126.3 | 129.1 | |
| 21 days | 169.6 | 166.9 | |
| 28 days | 200.2 | 198.7 | |
| Average gain 0-28 days (gram) | 148.2 | 146.1 | |
| Grams feed consumed/rat: | | | |
| 0-7 days | 80.7 | 272.0 | 90.7 |
| 7-14 days | 118.2 | 393.8 | 131.3 |
| 14-21 days | 134.1 | 414.7 | 138.2 |
| 21-28 days | 141.8 | 502.7 | 167.6 |
| 0-28 days | 474.8 | 1583.2 | 527.7 |
| Grams feed/gram gain: | | | |
| 0-7 days | 2.26 | 7.82 | 2.61 |
| 7-14 days | 3.06 | 9.44 | 3.15 |
| 14-21 days | 3.10 | 10.97 | 3.66 |
| 21-28 days | 4.62 | 15.81 | 5.27 |
| 0-28 days | 3.20 | 10.84 | 3.61 |

The packages of gelled feed and water can be introduced directly into the cages to provide nourishment for the animals, however, to maintain the animals in their axenic condition it is necessary to introduce the packages to the animals in a way which prevents contamination. A satisfactory method is as follows:

EXAMPLE 2

An isolator unit is provided with a germicide trough which provides an opening to the isolator. The trough may be of the "V" trap type having the trap sealed with Wescodyne solution or a similar germicide. The packages of gelled feed and water are introduced through the exterior leg of the "V" into the trap of germicide. The packages remain in the germicide solution for a length of time sufficient to destroy any organisms on their surfaces. The packages are transferred into the isolator through the connecting leg of the "V" by manipulation of the Neoprene gloves mounted in the isolator wall. The packages are then introduced into the animals cages. The animals receive their entire supply of food and water from the packages. It is not necessary to store quantities of food and water in the isolator since a fresh package can be introduced daily if necessary. The space in the isolator which would have been occupied by the stored feed and water can be used to house additional animals. The production of axenic animals is rendered more efficient because a greater number of animals can be raised in a given space. The possibility of contaminating the animals is minimized since the feed and water are introduced to the animals in a sterile form without the necessity of using the transfer sleeve.

We claim:

1. A method of sustaining axenic and gnotobiotic laboratory animals within a confined area, isolated from all other nonsterile living things in a sterile condition without a supplemental source of water comprising:
   a. mixing a gel forming animal feed with water to form a mixture containing between 70 and 80 percent by weight water,
   b. packaging the mixed feed and water in a flexible container which is impenetrable to contaminating organisms, but is penetrable by the laboratory animals,
   c. heating the container to about 250° F. to sterilize the product,
   d. forming a stable gel of the feed and water, and
   e. introducing the container to the confined area accessible to the said animals in a sterile condition, whereby the animals can penetrate the container to obtain food and water without being exposed to extraneous contamination.

2. The method of claim 1 wherein the feed and water gel contains between 74 and 77 percent by weight water.

3. The method of claim 1 wherein the stable gel contains 74–77 percent water, 6–8 percent protein, 12–18 percent carbohydrate, 0.7–1.5 percent fat, and 0.9–1.3 percent fiber.

4. The method of claim 1 wherein the nutrient and water mixture is heated to a temperature of 140° to 190° F. prior to filling the flexible containers.

5. The method of claim 1 wherein a dispersing agent is added to the nutrient and water mixture.

6. The method of claim 5 wherein the dispersing agent is sodium alginate.

* * * * *